Patented Aug. 13, 1929.

1,724,180

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

CHEMICAL PRODUCTS AND METHOD OF MAKING THEM.

No Drawing. Application filed March 2, 1928. Serial No. 258,672.

This invention relates to new chemical substances, the poly nitro phenyl benzo thiazyl sulphides, and to a process of making them.

One of these compounds, 2-4 dinitrophenyl benzothiazl sulphide may be prepared as follows:

40 grams of sodium hydroxide are dissolved in 500 grams of water and 168 grams of mercapto benzothiazole and 500 cc. of 95% alcohol are added. The mixture is heated to 50-60° C. until all the mercapto benzothiazole has dissolved. 202½ grams of dinitrochlorbenzol are then added and the mixture heated under a reflux condenser until the dinitrochlorbenzol has disappeared. The mixture is then cooled and the 2-4 dinitrophenyl benzothiazyl sulphide which precipitates out is removed by filtration, washed free of sodium chloride, dried and ground. The melting point should be 156-157° C. On further purification the melting point is 162½° C. It is a yellow material crystallizing in prisms that melt at 162½° C. uncorrected. The body is insoluble in water and practically insoluble in cold alcohol. It is fairly soluble in hot alcohol, quite soluble in warm benzol and fairly soluble even in cold benzol. It is soluble in cold acetone. Its alcoholic solution hydrolyzes in the presence of alkali. The probable formula is

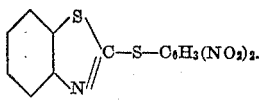

Another example of this class of compounds is 2, 6 dinitro 4 chlorophenyl benzothiazyl sulphide which may be prepared as follows:

168 grams of mercapto benzothiazole are dissolved in 500 cc. of alcohol and 500 cc. of water by means of the addition of 40 grams of sodium hydroxide. The solution then contains the sodium salt of mercapto benzothiazole. To this solution are added 237 grams of 2.6 dinitro 1.4 dichlorobenzol and the whole heated to 60-70° until all of the 2, 6 dinitro 1, 4 dichlorobenzol has disappeared. The reaction mixture is then cooled to room temperature whereupon the product which is the 2, 6 dinitro 4 chlorophenyl benzothiazyl-sulfide crystallizes out. This is filtered from the reaction mixture, washed free of sodium chloride and dried. This is a yellow body, soluble in benzol, quite soluble in hot alcohol and fairly soluble in cold alcohol. The melting point is 167° C. uncorrected. The formula is

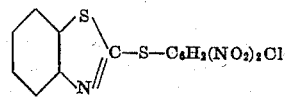

It will be observed that the nitro groups are in the 2, 4 or in the 2, 6 position, and are therefore meta to each other, and in the final compound one nitro group is ortho to the CS bond, with at least one remaining substituent meta to the nitro group.

It will also be observed that these new compounds contain the group

and they may be expressed also as containing

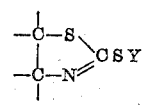

All of these compounds are accelerators of the vulcanization of rubber and all of them have anti-oxidant properties and improve the ageing of rubber, and particularly is this true of the 2-4 dinitrophenyl benzothiazyl sulphide. The 2-4-6 trinitrophenyl benzothiazyl sulphide, which may be also called picryl benzo thiazyl sulphide has the property of improving the flexing of a rubber compound.

Having thus described my invention, what I claim and desire to protect by Letters Patent is:

1. As new compounds the dinitro derivatives of benzo thiazyl sulphide in which one of the nitro groups is ortho to the CS bond and at least one of the remaining substituents is meta to the nitro group.

2. As new compounds the dinitro phenyl benzo thiazyl sulphides in which the two nitro groups are meta to each other, and one of them is ortho to the CS bond.

3. As new compounds the 2-4 dinitro phenyl derivatives of mercapto benzo thiazoles.

4. As new compounds the 2-4 dinitro phenyl thiol derivatives containing

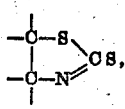

of mercapto benzo thiazoles.

5. As a new compound 2-4 dinitrophenyl benzo thiazyl sulphide.

6. A method of making dinitrophenyl benzo thiazyl sulphides which comprises treating an alcoholic solution of mercapto benzo thiazole and aqueous sodium hydroxide with dinitrochlor benzol, heating until the reaction is complete, cooling, separating out the reaction product, and purifying it.

7. A method of making 2-4 dinitrophenyl benzo thiazyl sulphide which comprises mixing an alcoholic solution of mercapto benzo thiazole and a water solution of sodium hydroxide, heating, and then treating with an equal molecular amount of dinitrochlor benzol, continuing the heating under a reflux until the dinitro chlor benzol has disappeared, cooling, filtering out the reaction product, purifying by washing and recrystallization.

8. The steps in making dinitrophenyl benzo thiazyl sulphides which comprise heating a solution of an alkali metal salt of mercapto benzo thiazole with a dinitrochlorbenzol until the reaction is complete, cooling, and separating out a dinitrophenyl benzo thiazyl sulphide.

Signed at New York, county and State of New York, this 23rd day of February, 1928.

SIDNEY M. CADWELL.